Dec. 31, 1940.     M. S. CURTIS     2,227,407
MACHINE TOOL
Filed March 6, 1939     3 Sheets-Sheet 1

Inventor
Myron S. Curtis,
By [signature]
Attorney

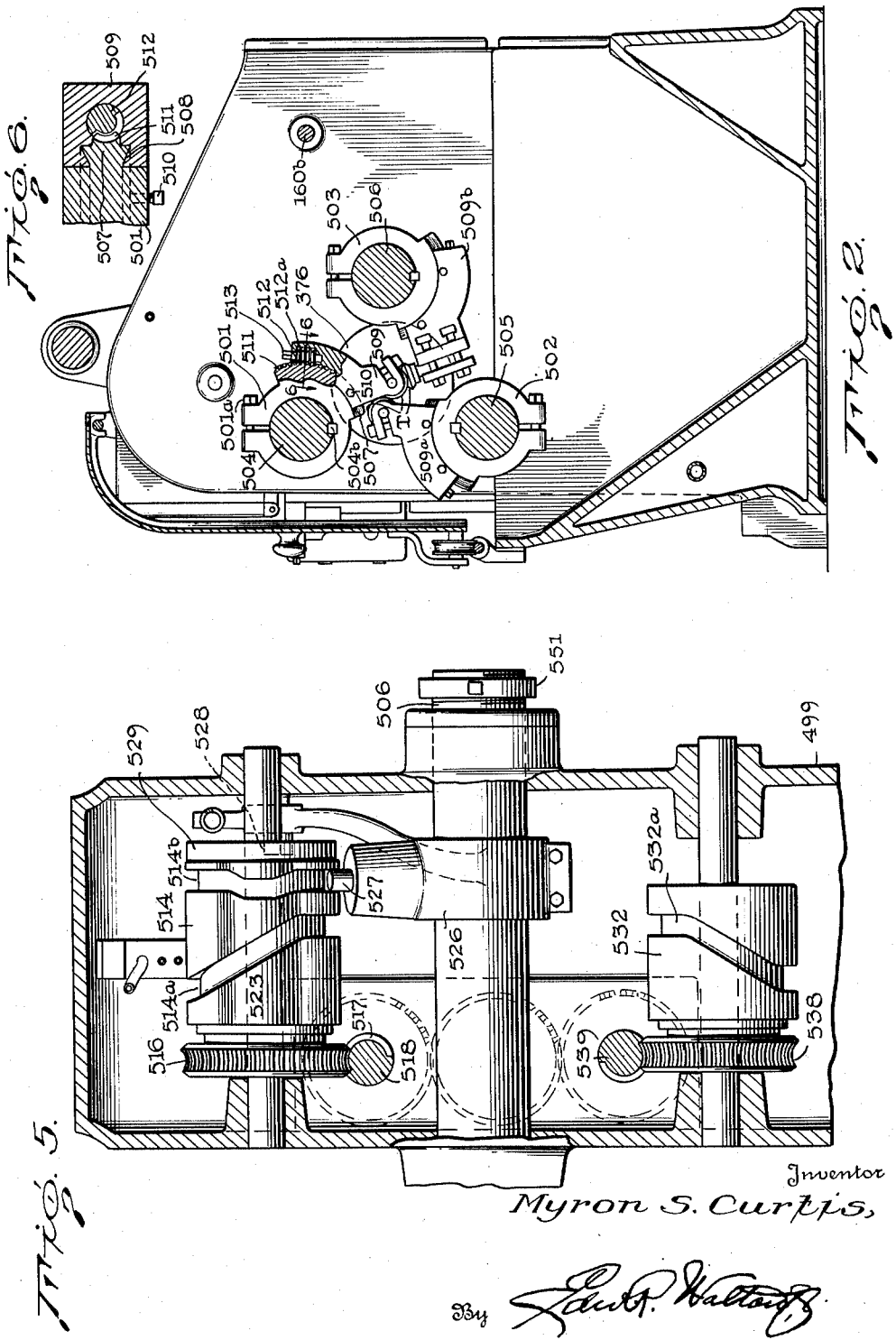

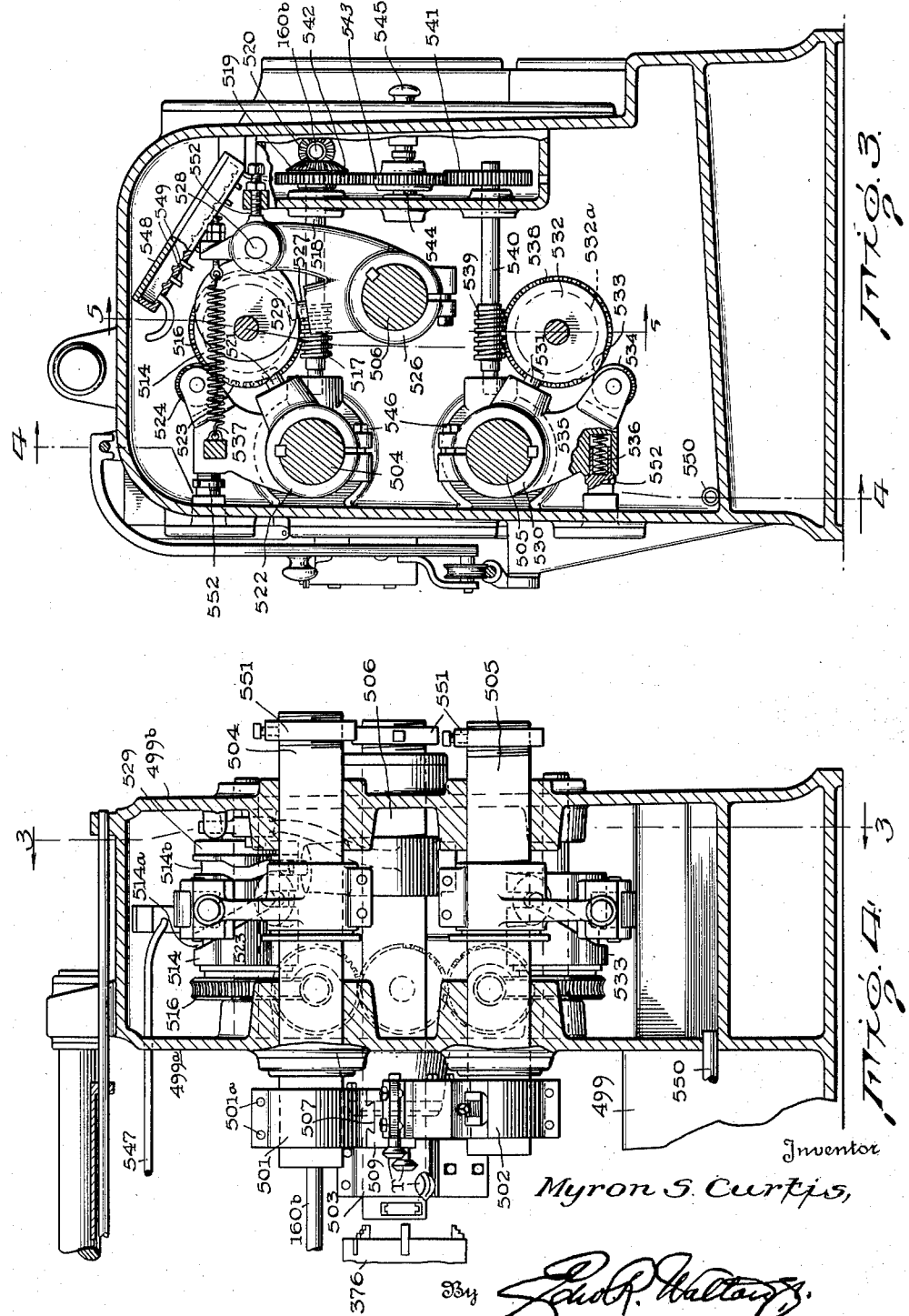

Patented Dec. 31, 1940

2,227,407

UNITED STATES PATENT OFFICE 2,227,407

MACHINE TOOL

Myron S. Curtis, Pawtucket, R. I., assignor to Potter & Johnston Machine Company, Pawtucket, R. I., a corporation of Rhode Island Application March 6, 1939, Serial No. 260,131

9 Claims. (Cl. 29—27)

The present invention is a machine tool of the single-cut lathe type.

The object of the invention is to provide an improved mechanical tool slide mechanism for lathes of the above mentioned type having certain functional and economical advantages in certain types of plants and with certain types of work.

An object of the invention is to produce a tool slide mechanism of the above stated character which may be readily coupled and used with the power plant unit shown and described in my co-pending application Serial No. 212,565.

Another object of the invention is the provision of machine tools of the bar feed type having actuating means for operating a plurality of bars for a common source and means for adjusting the actuating means to vary the timing of said bars; and, further, in providing a novel construction and adjustment between the tool head and tool carriers.

With the above and other objects in view, which will appear as the specification proceeds, the invention resides in the sundry details of construction, combination and arrangement of parts as hereinafter more fully described and pointed out in the appended claims.

In the drawings, which show the preferred embodiment of the invention as at present devised:

Figure 2 is a transverse sectional view taken substantially on line 2—2 of Fig. 1 and looking in the direction of the arrows;

Figure 3 is a transverse sectional view taken substantially on line 3—3 of Figs. 1 and 4, looking in the direction of the arrows;

Figure 4 is a longitudinal sectional view taken substantially on line 4—4 of Fig. 3, looking in the direction of the arrows;

Figure 5 is a sectional view taken substantially on line 5—5 of Fig. 3 and looking in the direction of the arrow; and Figure 6 is a detail sectional view taken substantially on line 6—6 of Fig. 2.

Figure 1:
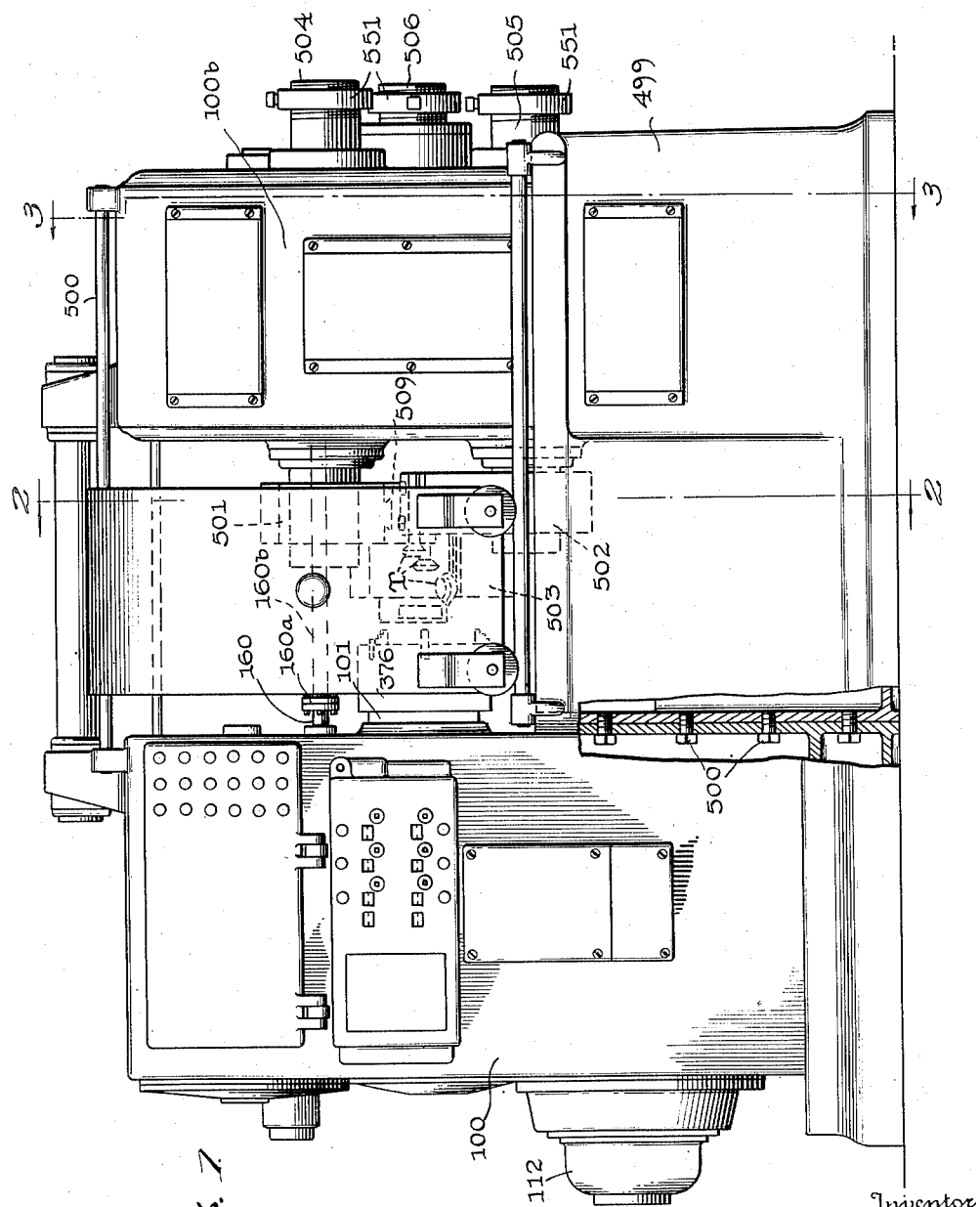
Figure 1 is a front side elevation of the machine according to the invention.

Referring in detail to the drawings, the numeral 100 designates a power unit comprising a centralized mechanism including, at least, a rotatable spindle 101 having a chucking device 376, means embracing a motor 112 for actuating the spindle and the secondary tool operating unit 100b attached to the power unit 100, a control means (manual and/or automatic) for both the spindle and the secondary unit. The power unit 100 is identical, or substantially so, with the power unit bearing the same numeral in the aforesaid co-pending application and there is a selective drive connection in between the motor 112 and the spindle 101, between the spindle and the feed shaft 160, and there is a connectible and disconnectible constant speed driving member for the feed shaft 160.

That which is called, for convenience, the secondary unit 100b, is substantially identical with the unit bearing the same numeral in Figure 2 of said copending application and comprising a housing or frame 499 having a wall detachably connected by bolts or other fastener means 500 to a contiguous wall of the power unit 100 (see Fig. 1) so as to maintain the units in proper rigid and stationary position with respect to each other. The power unit 100 has a tool feed shaft 160 having a coupling 160a by which a corresponding feed shaft 160b of the secondary unit 100b may be connected and disconnected to the feed shaft driving means of the power unit 100.

The secondary unit 100b carries tool-heads 501, 502, and 503 and is disposed at one end of the machine so that the tool-heads may be moved to and from the chuck in a direction axially of the chuck, and portions of the frame 499 are arranged to provide means for supporting and housing the shafts and other actuating mechanism for the tool-heads, Figs. 1, 3, 4, and 5.

Suitably mounted for rotatable and endwise slidable movement in bearing on the wall 499a and 499b, are bars 504, 505, and 506, preferably arranged in spaced relation about the axis of the spindle 101, with their inner ends (i. e., the one adjacent the spindle) projecting beyond the wall 499a of the housing and upon which are disposed heads 501, 502, and 503, respectively.

As these tool heads are substantially the same only one (i. e. 501) will be described in detail and comprises a split annular body embracing the inner projecting end of the bar 504 and clamped thereon by bolt 501a extending through it, a key 504b being provided to prevent rotation between the parts.

The outer surface of the tool-head is provided with a portion having a circular or arcuate tail rib 507, extending, at least, partially around the head. The rib 507 is mounted in a complemental dove-tail slideway 508 in a tool holder 509, Figs. 1, 2, 4, and 6. A worm 512 is suitably mounted on the tool-holder 509 to mesh with a worm gear 511 cut in the tool-head so that by rotation of worm 512, by a hand tool engaging squared end 513, the tool-holder 509 may be adjusted about the tool-head 501, a binder screw 510 being provided to hold the parts 501 and 509, additionally, in adjusted positions. The worm gear 511 is preferably provided on the out face of the rib 507 and the worm disposed in a recess 512a in one end portion of the tool-holder 509.

The cutters or tools T carried in tool holders 509, 509a and 509b on the head 501, 502 and 503 respectively are to be moved into engagement with the work held in the chuck 376 and to be fed relatively with respect to the work to perform the desired cutting operation by their respective bars 504, 505 and 506. These tools may operate synchronously, sequentially, intermittently or individually, as may be desired.

In order to accomplish the actuation of the tools as just mentioned, mechanism is disposed in the housing between the walls 499a and 499b for accomplishing this purpose and which is driven from the feed shaft 160–160b (see Figs. 1, 3, and 4), which in turn is actuated from the power unit 100.

Disposed in the housing and adjacent the bars 504 and 506 is a drum 514 journalled on an axis substantially parallel with said bars. Fast to, or otherwise mounted to rotate the drum 514, is a worm gear 516 meshing with a worm 517 on a shaft 518 having a gear 519 fast thereon meshing with a gear 520 on the feed shaft 160b. The drum 514 is of sufficient length to accommodate two cam paths 514a and 514b (Figs. 4 and 5), the former for the purpose of moving the bar 504 longitudinally and the latter for moving the bar 506 longitudinally. The extent or pitch of these cam paths may vary according to the movement it is desired to impart to the respective tools on these bars 504 and 506. For instance, if the tool-head 503 is to turn the face of the work, its movement toward and away from the chuck would be less than the movement of the tool head 501 which may be for boring and internally grooving or outside turning. Consequently the paths 514a and 514b may be of different pitch or contour.

Cooperating with the cam path 514a on drum 514 is a cam roller 521 carried on a sleeve 522 keyed on the bar 504 by which said bar may be reciprocated. The drum 514 is also provided with a face cam in the form of a lobe 523 which extends axially the length of said drum. Bearing against the face cam 533 is a cam roller 534 carried on an arm 535 rigidly connected with the sleeve 522. The roller 524 is of greater width than the cam path 514a so that it may span the same when crossing the path during the longitudinal reciprocating motion of the bar 504. Thus it will be seen that the bar 504 will be reciprocated longitudinally toward and away from the work by the cam path 514a as the drum 514 rotates and will be oscillated by the face cam 523 to move the tool in contact with or away from the work. The position of the lobe of the face cam 523 with respect to the cam path 514 will, of course, determine whether the tool is to be brought into contact with the work before or after the bar 504 is moved longitudinally or whether these two functions are to be performed at the same time. The bar 506 is operated in a similar manner to the bar 504 and has a sleeve 526 keyed thereto which carries a cam roller 527 which engages in the cam path 514b in the drum 514 for reciprocating the bar 506 longitudinally and also has an arm carrying a cam roller 528 for riding a face cam 529 on one end of the drum 514 whereby the bar 506 is oscillated. The sleeve 526 is similar to the sleeve 522 as can be readily seen.

The cam drum 532, in the same manner as the cam drum 514, is journalled on an axis substantially parallel with the bar 505 and has fast therewith a worm 538 which meshes with a worm 539 on a shaft 540. The shaft 540 has fast on one end thereof a gear wheel 541 which is driven from a similar gear wheel 542 fast on the shaft 518 through an intermediate slip gear 543. The intermediate gear 543 revolves loosely on a stud 544 which by means of a knob 545 may be moved axially to engage or disengage the gears 541 and 542 whereby the relative positions of the drums 514 and 532 may be thereby altered for timing purposes, or entirely disconnected.

The bar 505, which may be employed as here shown for turning the exterior diameter of the work-piece, is operated in a manner similar to the bar 504 having a sleeve 530 keyed thereon and having a cam roller 531 which engages in a cam path 532a in a cam drum 532 for reciprocating the bar 505 longitudinally. The cam drum 532 also is provided with a face cam in the form of a lobe 533 (see Figs. 3 and 4) over which rides a broad cam roller 534 carried on the arm 535 rigid with the sleeve 530. As shown in the drawings both the face cam rollers 524 and 534 are spring pressed against the surfaces of their respective cam drums 514 and 532 by springs 536. In like manner the face cam roll 528 of the bar 506 is held against its face cam 529 by a spring 537 in the manner indicated in Fig. 3. The longitudinal inward movement of the bars 504, 505 and 506 may be limited by fixed stop 551, adjustably mounted on the outer end of said bars, respectively, to engage an abutment such as the wall of the housing 499b for an example; and the rotatable or oscillatory movement of said bars may each be limited by adjustably fixed stops 552, see Figs. 1, 3, and 4.

The sleeves 522, 526 and 530 are split sleeves whose split ends are connecteed by clamping bolts 546, thus enabling the sleeves to be adjusted longitudinally on their respective bars.

As above stated the arrangement of the lobes on the face cams, which produce the oscillation of the bars, can be varied to provide for any combination of longitudinal and axial movement of the respective bars.

In order to oil the actuating mechanism of the bars a pipe 547 is connected to a suitable source of supply for delivering oil to a distributor 548 from whence it flows through distributing pipes 549 to various parts in the mechanism and thence by gravity to the sump in the bottom of the housing, where it returns and is drained off by the pipe 550.

Having thus described the invention and the manner in which the same is performed, in accordance with the preferred embodiments of the invention as at present devised, it is to be understood that the exact construction, combination and arrangement of parts may be modified and varied within the scope of the appended claims, as the invention is susceptible of various modifications, changes, and variations without departing from the scope thereof and the improvement and advancement in the art afforded thereby.

What is claimed is:

1. In a machine-tool, a tool feeding mechanism including a frame and comprising a plurality of tool actuating bars arranged to extend in the same general direction and mounted in said frame for longitudinal sliding movement and for rotary movement about their axes, a tool head mounted on the ends of each of the bars, respectively, and arranged so that the tools of each bar may be brought into cooperative engagement with the work piece, a feed shaft, a cam drum journalled in the frame and driven from said feed shaft, path cam means in the drum for reciprocating one or more of said bars and face cam means on the drum for oscillating one or more of said bars, and cam followers extending from one or more of said bars and actuated by said cam means, a second cam drum for the other of said bars and provided with groove cam means and face cam means thereon for reciprocating and oscillating said bars, respectively, said last mentioned bars having followers extending therefrom and engaging said last mentioned cam means, and a disconnectible means for driving said last mentioned cam drum from said feed shaft.

2. In a machine-tool, the combination of a plurality of bars mounted for longitudinal reciprocable motion and for rotative movement about the longitudinal axis of the bars for operating tools, means for actuating said bars from a common source of power including cams for each bar for effecting movement of said bars, and a manually operable slip-gear drive connection between the cams of at least one of said bars and said source of power for rendering said bar inoperative or effecting a different timing arrangement between the actuation of said last mentioned bar and the other of said bars.

3. In a machine-tool, a plurality of longitudinally reciprocable tool carrying bars, one arranged for hole-boring or internal grooving operation, another for outside diameter turning and another arranged for end facing, said bars being also mounted for oscillation about their longitudinal axes, a rotary member having separate cam means thereon for reciprocating said hole-boring or internal grooving bar and said facing bar respectively, said rotary member having separate face cams thereon for oscillating said hole-boring or internal grooving bar and said facing bar respectively, cam followers on said hole-boring or grooving bar and on said facing bar for engaging with their respective cams, a rotary member having cam means for reciprocating said outside turning bar and having a face cam for oscillating said bar, a drive connection between said first mentioned rotary member and a common source of power, and a disconnectible drive connection between said first mentioned drive connection and said second mentioned rotary member, whereby different timed operation between certain of said bars may be effected or entirely disconnected.

4. In a machine-tool, the combination of a plurality of longitudinally slidable and axially rotatable tool operating bars grouped together so that the tools thereon may be brought into operative position at a work station, a cam drum having path cams and face cams thereon for operating two of said bars, a cam drum having path cam means and face cam means thereon for operating other of said bars, an arm on each of said bars, a path cam follower and a face cam follower on each of said arms to contact with their respective cams and to move across the face of their respective cam drums and means for driving said cam drums.

5. In a machine-tool, the combination of a rotatable spindle for holding work, a feed shaft, a plurality of longitudinally slidable and axially rotating tool operating bars, cam means for actuating one or more of said bars longitudinally and axially a gear connection between said shaft and cam means, other cam means for actuating the other of said bars, and a disconnectible gear connection between said first and second cam means, whereby one cam means may be adjusted with respect to the other for timing purposes.

6. In a machine-tool, the combination of a rotatable spindle for holding work; a shaft; a housing containing said spindle, said shaft, and their driving and controlling mechanism; a plurality of longitudinally and rotatably movable bars; means, including a cam drum and cams, actuated from said shaft for moving one or more of said bars longitudinally and rotatably; means, including a cam drum and cams actuatable from said shaft for moving others of said bars longitudinally and rotatably; and a separate housing containing said bars and said cam drums and to be arranged in cooperative relation with said first mentioned housing.

7. In a machine tool, the combination of a rotatable spindle for holding work; a shaft; a driving connection between the spindle and the shaft; a housing containing said spindle, said shaft, and their driving and controlling mechanisms; a plurality of longitudinally and rotatably movable bars, means for actuating one or more of said bars longitudinally and rotatably including a cam drum and cams, means for actuating others of said bars longitudinally and rotatably including a cam drum and cams, means for driving said cam drums synchronously from said shaft, means for adjusting one cam drum with respect to the other for timing purposes, a housing supporting said bars and their actuating means, a tool carrier on each bar respectively, circular bearing surfaces between each tool carrier and its bar, means for clamping each tool carrier to its bar, an arm fastened to each of said bars and carrying cam rolls for longitudinal and rotatable movement with said bar, and resilient means for holding said cam rolls in contact with said cam.

8. In a machine tool, the combination of a work holding means, a plurality of longitudinally movable and axially rotatable tool actuating bars grouped about the work holding means so that the tools may operate on the work, tool heads removably fastened to one end of said bars and capable of longitudinal adjustment on said bars, tool carriers adjustably mounted on said heads, respectively, for arcuate movement relative to the axes of their respective bars, and means for effecting adjustment of said tool carriers in their arcuate movement.

9. In a machine tool as set forth in claim 8 wherein said bars have their end portions mounted in a frame, and stop members adjustably mounted on the ends of said bars opposite to said tool head ends to engage said frame for limiting the longitudinal sliding movement of said bars.

MYRON S. CURTIS.